United States Patent

Weishut et al.

[11] Patent Number: 5,999,606
[45] Date of Patent: *Dec. 7, 1999

[54] TELECOMMUNICATION STATION WITH CALL BLOCKING AND CALL TRANSFERRING CAPABILITIES

[75] Inventors: Gideon M. R. Weishut, Eindhoven; Mascha M. C. C. Van Oosterhout, Eemnes; Walter J. Slegers, Eindhoven, all of Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/706,113

[22] Filed: Aug. 30, 1996

[30] Foreign Application Priority Data

Aug. 31, 1995 [EP] European Pat. Off. ............... 95202351

[51] Int. Cl.[6] .............................. H04M 1/66; H04M 1/64; H04M 3/54; H04M 3/58

[52] U.S. Cl. .................. 379/199; 379/88.01; 379/88.16; 379/210; 379/212

[58] Field of Search ................................ 379/67, 88, 210, 379/211, 212, 188, 201, 142, 88.01, 88.16, 199

[56] References Cited

U.S. PATENT DOCUMENTS

| | | | |
|---|---|---|---|
| 4,277,649 | 7/1981 | Sheinbein | 379/201 |
| 4,782,508 | 11/1988 | Borchering et al. | 379/67 |
| 5,029,196 | 7/1991 | Morganstein | 379/211 |
| 5,388,150 | 2/1995 | Schneyer et al. | 379/67 |
| 5,408,528 | 4/1995 | Carlson et al. | 379/142 |

OTHER PUBLICATIONS

SOPHO–SET S375 (D) User Guide, Published by Philips Communication Systems, Hilversum, The Netherlands, Nov. 1990.

Pp. 48 & 49 of the Sopho–Set S375 (D) User Guide, published by Philips Communication Systems, Hilversum, The Netherlands, Nov. 1990. "Follow Me" is a facility by which the user can block and divert all incoming calls to a number to be indicated by him. "Do Not Disturb".

*Primary Examiner*—Harry S. Hong
*Attorney, Agent, or Firm*—Jack D. Slobod

[57] ABSTRACT

A telecommunication station having the capability to both block selected incoming calls and transfer other selected incoming calls. The station further has the capability to provide user messages to the blocked calls and thereafter, if desired, further divert the blocked calls to another selected station.

7 Claims, 6 Drawing Sheets

TELECOMMUNICATION STATION WITH CALL BLOCKING AND CALL TRANSFERRING CAPABILITIES

BACKGROUND OF THE INVENTION

The invention relates to a telecommunication station comprising reproducing means and blocking means for blocking incoming calls.

Such a telecommunication station is, for example, the SOPHO-SET S375(D) business telephone by Philips. This telephone has various facilities for blocking calls and diverting calls, as required, such as "follow me" and "do not disturb" facilities. These facilities are described on pages 48 and 49 of the Sopho-Set S375(D) User Guide, published by Philips Communication Systems, Hilversum, The Netherlands, November 1990. "Follow me" is a facility by which the user can block and divert all incoming calls to a number to be indicated by him. "Do not disturb" is a facility by which the user simply blocks all incoming calls.

The "do not disturb" and "follow me" facilities do not enable the user to block specific incoming calls and not to block others.

OBJECTS AND SUMMARY OF THE INVENTION

It is an object of the invention to provide a telecommunication station in which the user can simply set which calls he wishes to have blocked and which calls he wishes to have transferred.

A telecommunication station according to the invention is characterized in that the telecommunication station is arranged for reproducing a set of instructions for use at least comprising a number of blocking possibilities, and in that the station comprises selection means for a user to select desired blockings, the blocking means being arranged for blocking or transferring the incoming calls in dependence on blockings selected by the user. So the user can, by simply selecting desired blockings, set which incoming calls are to be blocked and which incoming calls are to be transferred.

An embodiment of a telecommunication station according to the invention is characterized in that the reproducing means are arranged for visually reproducing the blocking possibilities. This achieves that in a user-friendly manner the user is presented with the possibilities of blocking incoming calls.

A further embodiment of a telecommunication station according to the invention is characterized in that the reproducing means are arranged for auditively reproducing the blocking possibilities. The auditive reproduction of the blocking possibilities is another user-friendly manner of presenting the possibilities of blocking incoming calls.

A further embodiment of a telecommunication station according to the invention is characterized in that the selection means comprise speech recognition means for recognizing the user's speech and selecting desired blockings on the basis of this speech recognition. This presents the user with the possibility of setting the desired blockings by means of speech.

A further embodiment of a telecommunication station according to the invention is characterized in that the station comprises a memory for storing selected blockings and in that, after the selected blockings have been activated, the blocking means are arranged for operating on the basis of the selected blockings. As a result, it is not necessary for the user to set the desired blockings again one by one each time he wishes to make use of the blocking function. By activating the selected blockings, the blocking means are set to the user's wishes in one go.

Another embodiment of a telecommunication station according to the invention is characterized in that the station comprises diverting means for diverting incoming calls which are to be blocked to a station selected by the user. As a result, the user has the possibility of diverting the calls to be blocked to another station, for example, his secretary's or a colleague's.

These and other aspects of the invention will be apparent from and elucidated with reference to the embodiments described hereinafter.

BRIEF DESCRIPTION OF THE DRAWINGS

In the drawings.

Like reference characters in the drawing Figures denote like components.

DETAILED DESCRIPTION OF THE PREFERRED EMBODIMENTS

Figure 1:
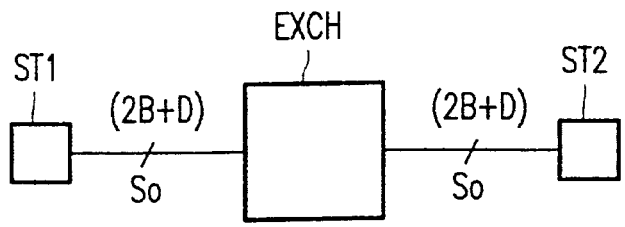
FIG. 1 shows a telecommunication system.

FIG. 1 shows an ISDN (Integrated Services Digital Network) telecommunication system. This telecommunication system comprises an exchange EXCH and telecommunication stations ST, two of which, ST1 and ST2, are shown explicitly by way of example. The stations are connected to the exchange by an S0-interface S0. The connection between stations and the exchange is formed by two user channels (2B) and one control channel (D).

Figure 2:
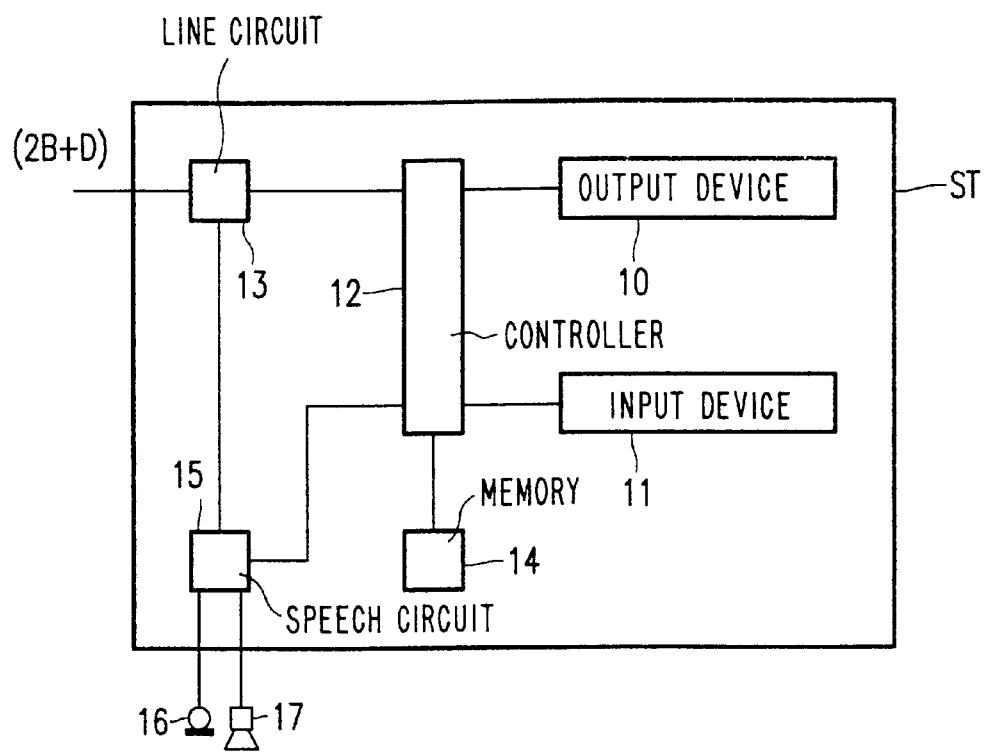
FIG. 2 shows in a block diagram a first embodiment of a telecommunication station according to the invention.

FIG. 2 shows in a block diagram a telecommunication station ST according to the invention. The station comprises an output device 10, an input device 11, control means 12, a line circuit 13, a memory 14 and a speech circuit 15, coupled to a microphone 16 and a loudspeaker 17. The line circuit 13, the memory 14, the speech circuit 15, the microphone 16 and the loudspeaker 17 are components known per se of digital telephone sets such as the SOPHO-Set S375 (D) by Philips. The output device 10 may be, for example, a display or a monitor. The input device 11 is, for example, a keyboard, but may also comprise a monitor with a mouse or a touch screen with an associated pointer. Desired commands can be clicked on the monitor/touch screen by the mouse/pointer. The control means 12, formed, for example, by a microprocessor, are primarily intended for setting up connections to other stations in the telecommunication system. This is effected by transmitting and receiving standardized messages by the control channel. The control means furthermore provide the reproduction of messages via the output device 10 and the blocking and diversion, as required, of incoming calls.

Figure 3A:
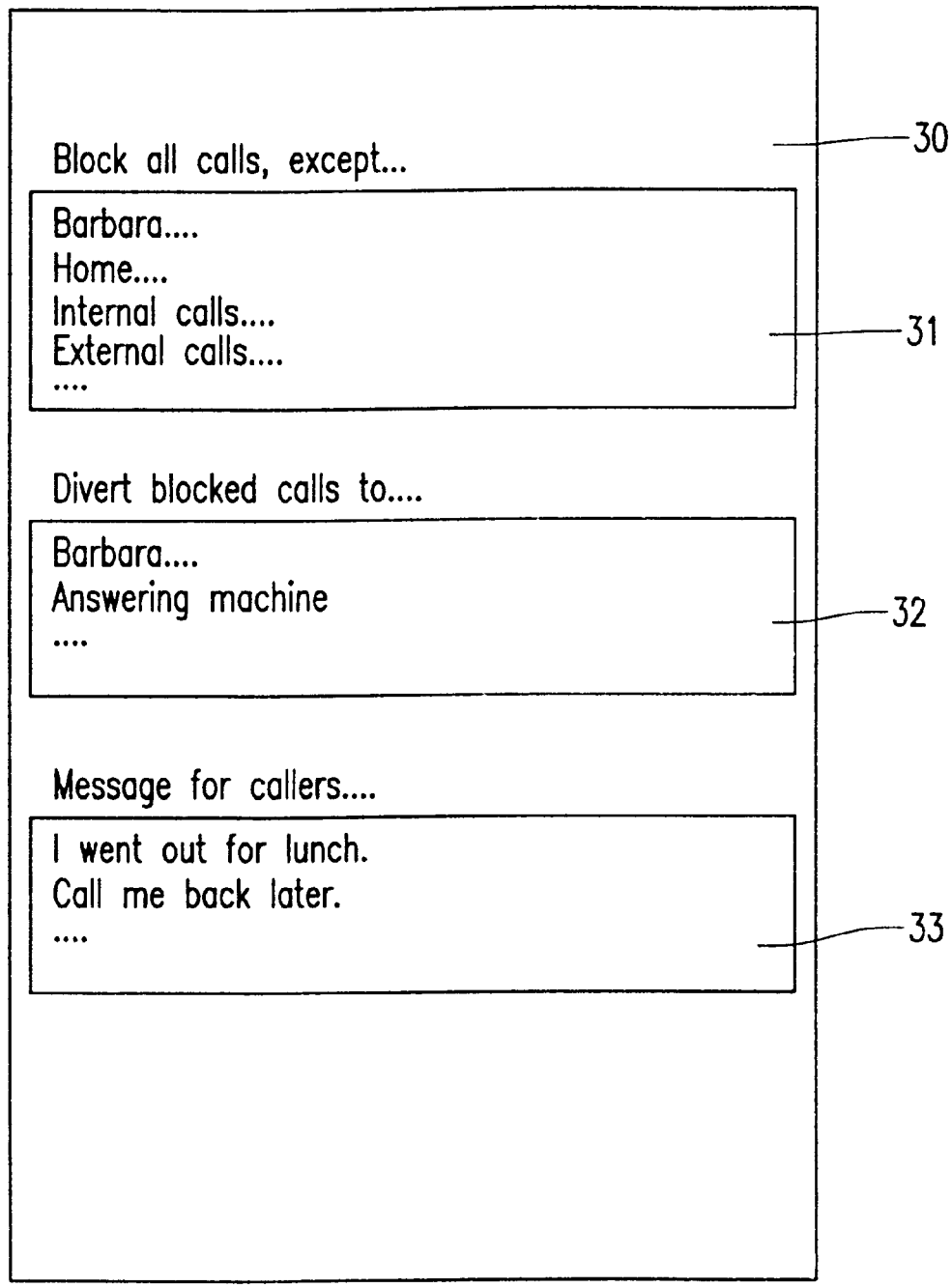
FIG. 3a shows a first example of a set of instructions for use according to the invention.

If the user wishes to indicate that he wants incoming calls to be blocked and possibly diverted, he invokes a set of instructions for use specially intended for this purpose by, for example, a preselection key in the case where the input device 11 is a keyboard, or by clicking on a certain icon on the monitor/touch screen by the mouse/pointer. FIG. 3a shows a first example of such a set of instructions for use 30 according to the invention. The set has a first frame 31. In this first frame are depicted possibilities for blocking incoming calls. These blocking possibilities may consist of, for example, designated groups or individuals either to be blocked without being transferred or to be or transferred. These possibilities may be selected by the user, for example, by means of a mouse or by means of a pointer on the touch screen. Selected possibilities can be indicated in "inverse video" if the output device 10 is a monitor, which is to say, be displayed by means of bright letters against the dark background, whereas the non-selected functions are displayed in normal fashion. By selecting individual stations or groups of stations in the set of instructions for use shown in FIG. 3a, the user provides that the incoming calls coming from these stations are transferred, whereas incoming calls from other, non-selected stations are blocked. This is indicated by the text "block all calls except . . . " over frame 31. Needless to observe that it is likewise possible to present a set of instructions for use in which the user, by selecting stations, blocks the incoming calls coming from these stations, whereas calls coming from non-blocked stations are transferred.

Figure 3B:
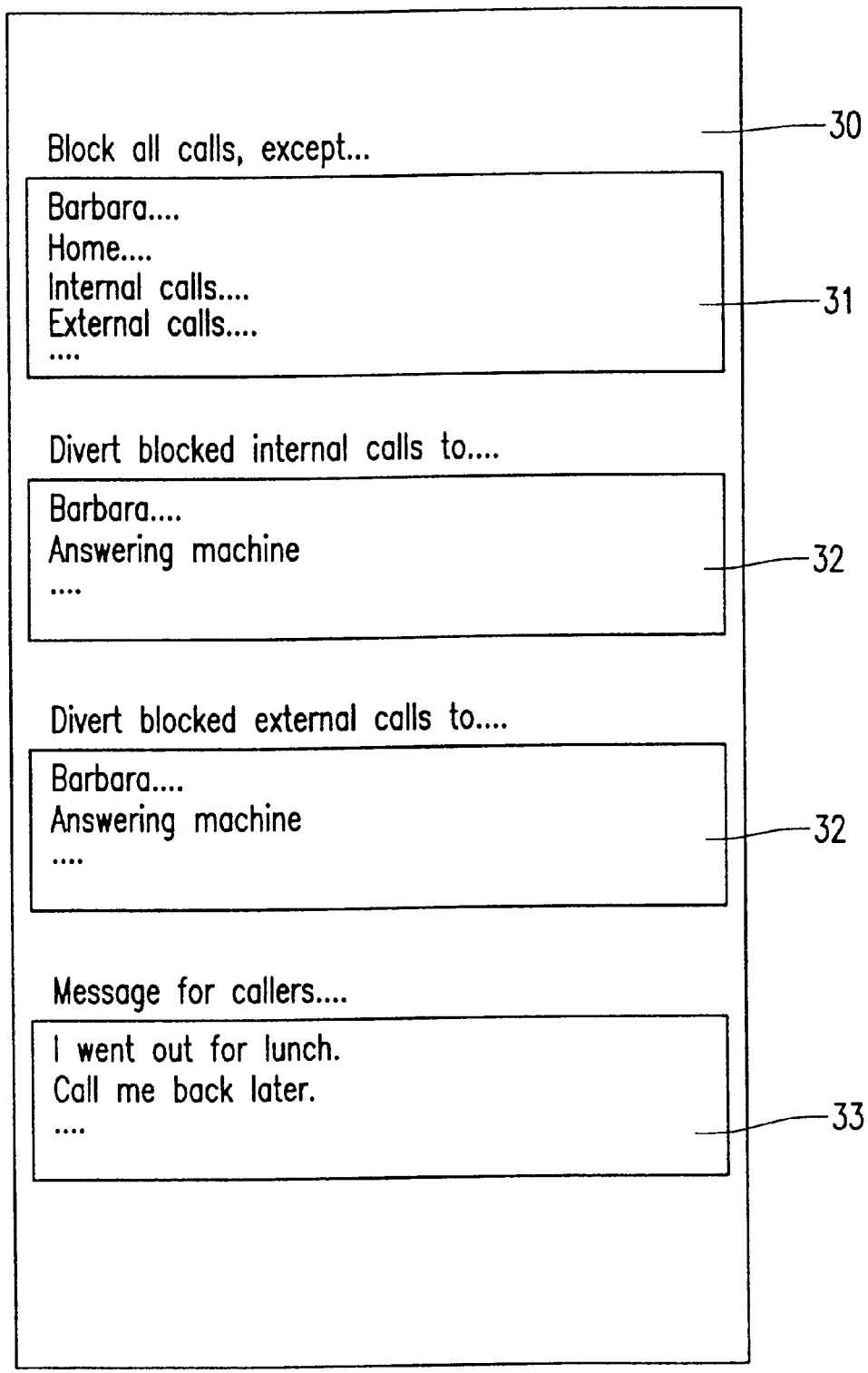
FIG. 3b shows a second example of a set of instructions for use according to the invention.

A second frame 32 contains the possibilities of call diversion. This is denoted by the text "divert blocked calls to . . . " over frame 32. These possibilities indicate stations to which the calls to be blocked can be diverted. By selecting such a station, the user can divert the calls to be blocked to this station. With the set of instructions for use shown in FIG. 3a it is merely possible to divert all the calls to be blocked to the same station. Alternatively, it is possible, as is shown in FIG. 3b, to differentiate between the calls to be blocked. The set of instructions for use shown in FIG. 3b has two frames 32 intended to indicate where blocked calls are to be diverted to. The upper frame is intended to indicate where blocked internal calls are to be diverted to, which is indicated by the text "divert blocked internal calls to . . . ". The lower frame is intended to indicate where blocked external calls are to be diverted to, which is indicated by the text "divert blocked external calls to . . . ". In this manner it is possible, with the set of instructions for use shown in FIG. 3b, to divert internal calls to a different station from external calls.

A third frame 33 contains user messages intended for calling stations, which messages are to be blocked. This is indicated by the text "message for callers . . . " over the frame 33. By selecting a user message, a user can provide that this message is sent to calling stations if the blocking function is active. These user messages may be sent in any suitable manner, for example, by means of user-to-user signalling in the control channel or by using one of the user channels. Examples of such messages as are shown in frame 33 are: "I went out for lunch" and "call me back later".

The user himself can exactly define which groups/ individuals he wishes (does not wish) to be blocked. Also, blocked calls may be diverted to any desired station. By selecting the right possibilities, the user can easily program his desired situation. Example: If the user goes to a room of a colleague of his for a moment, and he does not wish to receive external calls there, but does internal calls, he can set this in the following manner: "Block all calls except external calls". Divert blocked calls (Barbara, home) and internal calls to the colleague's number. In the first frame he then selects "external calls", whereas he does not select "Barbara", "Home" and "Internal calls". In the second frame he provides that "Barbara" and "answering machine" are not selected, and fills in on the line underneath, the colleague's number, which he selects. All the internal calls, "Barbara" and "home" are blocked and diverted to the colleague. The external calls are not blocked, but transferred, as usual, to the user's station. Since the user is not in his own office, he will not be disturbed by the external calls.

After the user has set all the instructions for use, he may store them in the memory 14. When he leaves he can activate the set of instructions for use, for example, by depresssing a preselection key or clicking on the respective icon. When he returns, he can de-activate the set of instructions for use by depressing a preselection key or clicking on the icon. As a result, the user need not again set all the blocking and diverting possibilities before he leaves.

Figures 4, 6:
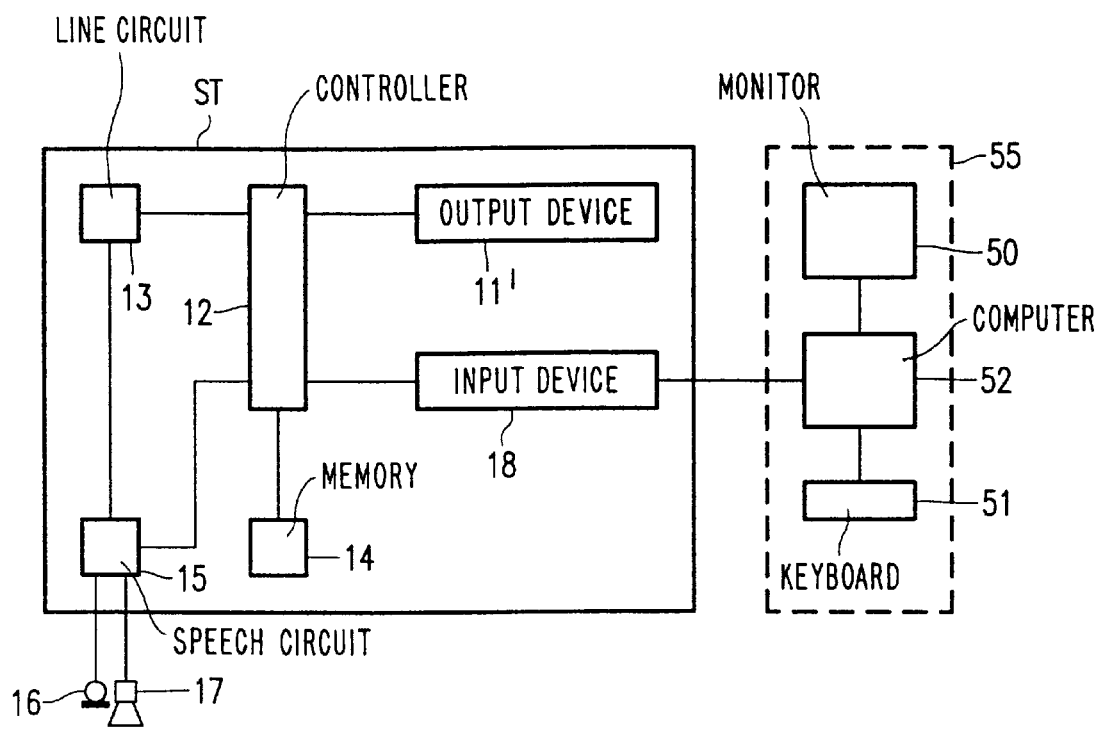
FIG. 4 shows a name memory for storing names and associated telephone numbers.
FIG. 6 shows a telecommunication station coupled to a Personal Computer configuration.

FIG. 4 shows a name memory containing names and associated telephone numbers to be filled in by the user. The user is to fill in the telephone numbers associated to the names used in the set of instructions for use. In this manner the control means, on reading the desired blockings and diversions, know the telephone numbers going with the names.

Figure 5:
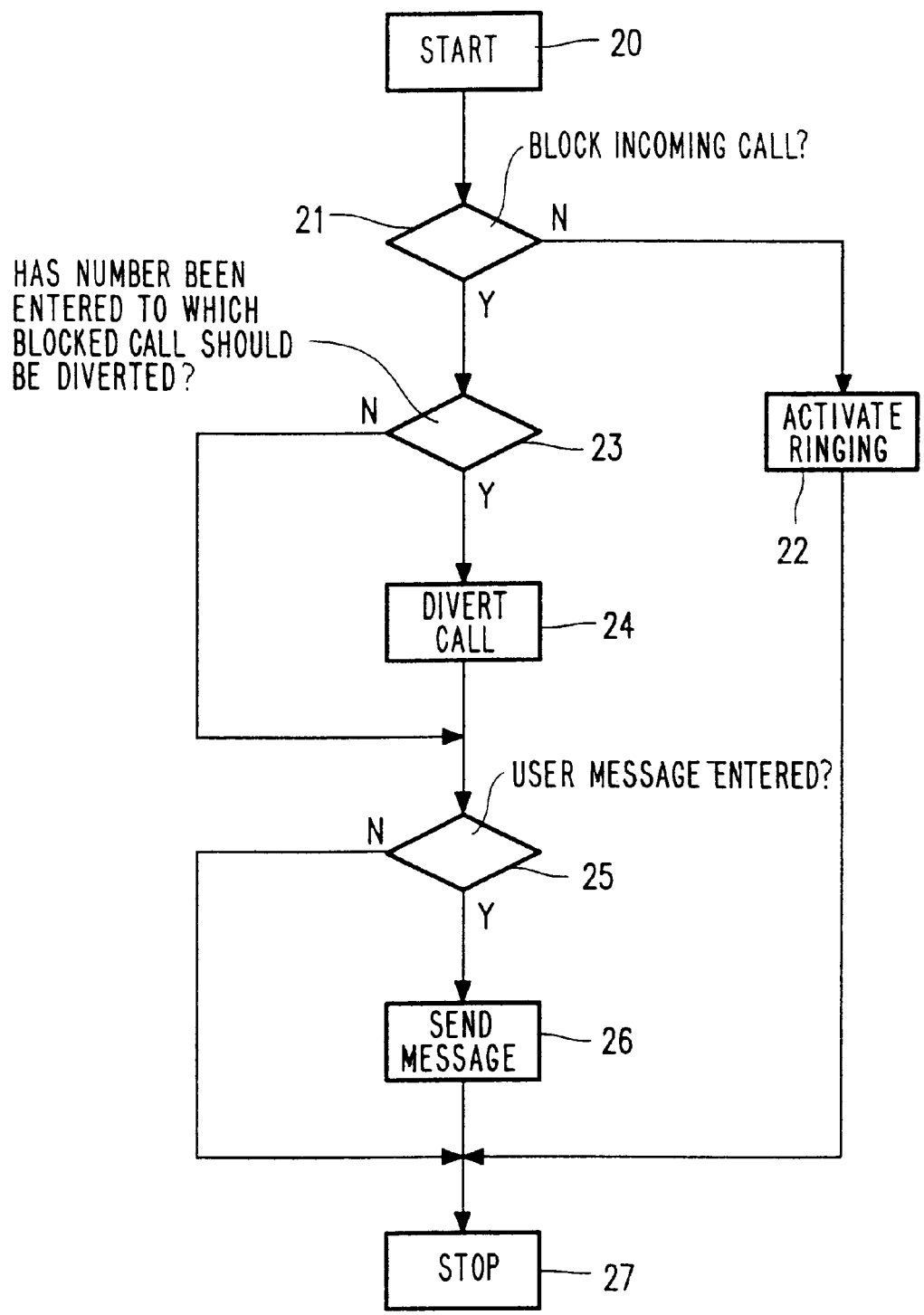
FIG. 5 shows a flow chart of the handling of incoming calls.

FIG. 5 shows a flow chart of a possible implementation of the handling of incoming calls if the blocking function is active. The blocks have the following connotation:

| Block: | Connotation: |
| --- | --- |
| 20 | Start. |
| 21 | Is the incoming call a call to be blocked? |
| 22 | Activate the ringing signal |
| 23 | Has a number been entered to which blocked calls are to be diverted? |
| 24 | Divert the call to the number entered |
| 25 | Has a user message been entered which is to be sent to the calling station? |
| 26 | Send this user message to the calling station |
| 27 | Stop. |

In block 21 there is decided whether the incoming call is a call to be blocked. If this is not a call to be blocked, the ringing signal of the telecommunication station is activated in block 22. If the incoming call is indeed a call to be blocked, a number to which the blocked call is to be diverted is looked for in step 23. If such a number has been entered, the call is diverted to this number in step 24. In step 25, a user message to be sent to the calling station is looked for. If there is, this user message is sent to the calling station in step 26.

The incoming calls may be handled by the control means of the telecommunication station itself in dependence on the set of instructions for use. If, for example, a call is received at the station, which call is blocked according to the set of instructions for use, and is to be diverted to a certain further station, control means send a message to the exchange which, subsequently, establishes the connection between the calling station and the further station.

Another possibility is that after the desired blockings and possible diversions are set by the user, the control means of the station sends a series of messages to the exchange, which messages state which calls intended for the station are to be blocked and diverted. When a message to be blocked and diverted arrives at the exchange, the exchange establishes a connection between the calling station and the station to which the blocked calls are to be diverted, without the intermediary of the station.

FIG. 6 shows a telecommunication station coupled to a Personal Computer configuration. The station comprises a standard telephone keypad 11' and no output device. The control means are coupled via an interface to the PC configuration 55. This PC configuration 55 comprises a monitor 50, an alphanumerical keyboard 51 and a computer 52. In lieu of programming the set of instructions for use by the input device of the end station itself, this may also be effected via the keyboard belonging to this computer, if the computer 52 comprises suitable software. The set of instructions for use may be displayed on the monitor 50 belonging to the computer. The station and the PC configuration are coupled in a manner known per se, for example, by an RS232 interface.

Figure 7:
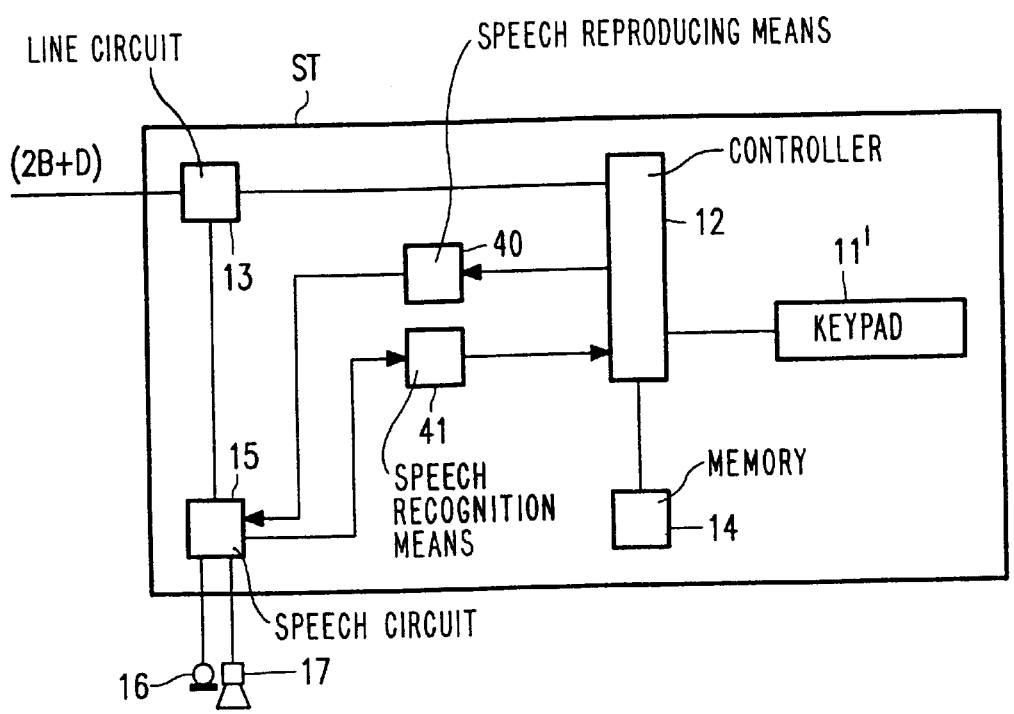
FIG. 7 shows a block diagram of a second embodiment of a telecommunication station according to the invention.

FIG. 7 shows a block diagram of a second embodiment of a telecommunication station according to the invention. The telecommunication station comprises speech reproducing means 40 and speech recognition means 41. The speech reproducing means are arranged for reproducing the blocking possibilities and diversion possibilities, if any, in the form of speech under the control of the control means 12. The speech recognition means are arranged for recognizing the user's speech and transferring this speech to the control means. The station according to this embodiment enables the user to set the desired blockings by means of speech. This may be effected by questions and answers between the telecommunication station and the user. This is as follows:

Telecommunication station: "Are the internal calls to be blocked?"
User: "NO."
Telecommunication station: "Are the external calls to be blocked?"
User: "Yes."
Telecommunication station: "Where are the blocked calls to be diverted to?"
User: "Barbara."
This completes the setting of the station to transfer internal calls and divert external calls to Barbara.

The invention has been described with reference to a number of embodiments. These embodiments, however, are merely meant as an example, of which variations are obviously possible. For example, it is possible to reproduce the blocking possibilities both auditively and visually, or let the user enter the settings by speech or by keyboard.

We claim:

1. A telecommunication station comprising:
    means for receiving instructions corresponding to at least one possibility of blocking without transferring and at least one possibility of transferring;
    selection means for permitting a user to select one or more incoming calls as being blockable without transfer to any station or facility which is responsive to voice signals carried by said incoming calls and one or more incoming calls as being transferable; and
    blocking and transferring means for blocking without transferring said one or more incoming calls selected by the user as being blockable without transfer and for transferring said one or more incoming calls selected by the user as being transferable; and
    means for providing a user message to incoming calls included in said one or more incoming calls selected by the user as being blockable without transfer.

2. The telecommunication station as claimed in claim 1, characterized in that the means for receiving instructions is arranged for visually reproducing the instructions.

3. The telecommunication station as claimed in claim 1, wherein the means for receiving instructions is arranged for auditively reproducing the instructions.

4. The telecommunication station as claimed in claim 3, wherein the selection means comprise speech recognition means for recognizing the user's speech and generating said instructions on the basis of this speech recognition.

5. The telecommunication station as claimed in claim 1, further comprising a memory for storing the received instructions, the blocking and transferring means being arranged for operating on the basis of the the stored instructions.

6. The telecommunication station as claimed in claim 1, wherein the blocking and transferring means comprises diverting means for diverting incoming calls which are to be transferred to a station selected by the user.

7. A telecommunication system comprising an exchange and at least a telecommunication station connected thereto, said station comprising:
    means for receiving instructions corresponding to at least one blocking possibility and one transferring possibility;
    means for receiving instructions corresponding to at least one possibility of blocking without transferring and at least one possibility of transferring;
    selection means for permitting a user to select one or more incoming calls as being blockable without transfer to any station or facility which is responsive to voice signals carried by said incoming calls and one or more incoming calls as being transferable; and
    blocking and transferring means for blocking without transferring said one or more incoming calls selected by the user as being blockable without transfer and for transferring said one or more incoming calls selected by the user as being transferable; and
    means for providing a user message to incoming calls included in said one or more incoming calls selected by the user as being blockable without transfer.

* * * * *